United States Patent [19]

Chaloner-Gill

[11] Patent Number: 5,300,375
[45] Date of Patent: Apr. 5, 1994

[54] ACRYLIC ALKOXY SILANE MONOMER AND SOLID ELECTROLYTE DERIVED BY THE POLYMERIZATION THEREOF

[75] Inventor: Benjamin Chaloner-Gill, Santa Clara, Calif.

[73] Assignee: Valence Technology, Inc., San Jose, Calif.

[21] Appl. No.: 49,490

[22] Filed: Apr. 19, 1993

[51] Int. Cl.$^5$ .................................. H01M 10/40
[52] U.S. Cl. .................................. 429/192; 252/62.2; 556/410; 556/426; 556/436; 556/465
[58] Field of Search .................. 429/192; 252/62.2; 556/410, 426, 436, 465

[56] References Cited

U.S. PATENT DOCUMENTS

| | | | |
|---|---|---|---|
| 4,083,861 | 4/1978 | Seller et al. | 556/436 X |
| 4,424,392 | 1/1984 | Petty | 556/436 |
| 4,737,422 | 4/1988 | Knight et al. | 429/194 |
| 4,978,473 | 12/1990 | Kuroda et al. | 252/62.2 X |
| 5,037,712 | 8/1991 | Shackle et al. | 429/192 |
| 5,112,512 | 5/1992 | Nakamura | 252/62.2 |
| 5,173,205 | 12/1992 | Marchese et al. | 252/62.2 |

*Primary Examiner*—Stephen Kalafut
*Attorney, Agent, or Firm*—Russell LaPaglia

[57] ABSTRACT

This invention is directed to a novel acrylic alkoxy substituted silane and to a single phase solid solvent-containing electrolyte having recurring units derived from such silane incorporated within the solid polymeric matrix of the solid electrolyte. A novel electrolytic cell that incorporates the subject electrolyte also is provided. The specific molecular structure exhibited by such solid polymeric matrix is believed to advantageously facilitate the positioning of an inorganic ion salt and solvent between adjacent polymeric molecules during service within the solid electrolyte.

20 Claims, No Drawings

ACRYLIC ALKOXY SILANE MONOMER AND SOLID ELECTROLYTE DERIVED BY THE POLYMERIZATION THEREOF

BACKGROUND OF THE INVENTION

1. Field of the Invention

This invention is directed to a novel acrylic alkoxy substituted silane as well as to solid electrolytes derived through the polymerization of the same.

This invention is further directed a solid electrolytic cell (battery) containing an anode, a cathode and a single phase solid electrolyte comprising a solid polymeric matrix containing recurring units derived from the acrylic alkoxy substituted silane, an inorganic ion salt, and a solvent.

2. State of the Art

Electrolytic cells containing an anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features.

The solid, solvent-containing electrolyte employed in such solid batteries has heretofore contained either an inorganic matrix or an organic polymeric matrix as well as a suitable inorganic ion salt. Because of their expense and difficulty in forming into a variety of shapes, inorganic non-polymeric matrices are, however, not preferred and the art typically has employed a solid electrolyte containing an organic or inorganic polymeric matrix.

Suitable organic polymeric matrices are well known in the art and are typically organic homopolymers obtained by the polymerization of a suitable organic monomer as described, for example, in U.S. Pat. No. 4,908,283 or copolymers obtained by polymerization of a mixture of organic monomers. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O$—where $R'$ is hydrogen or lower alkyl having from 1 to 6 carbon atoms.

Additionally, suitable organic monomers preferably contain at least one heteroatom capable of forming donor acceptor bonds with inorganic cations (e.g., alkali ions). When polymerized, these compounds form a polymer suitable for use as an ionically conductive matrix in a solid electrolyte.

The solid electrolytes also contain a solvent (plasticizer) which is added to the matrix primarily in order to enhance the solubility of the inorganic ion salt in the solid electrolyte and thereby to increase the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane, and the like.

Heretofore, the solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (a glyme and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (e.g. heat, ultraviolet radiation, electron beams, etc.) so as to form the solid, solvent-containing electrolyte.

While the electrolytes described above perform adequately in their intended role, there is need for improvement in several areas. First, the conductivity of the electrolyte could advantageously be increased. Cumulative capacity of a solid battery is the summation of the capacity of the battery over each cycle (charge and discharge) in a specific cycle life.

Second, the electrolyte must be compatible with the typically used inorganic ion salt incorporated into the polymer matrix to aid in conductivity. The inorganic ion salt, which usually contains Li ion but which can contain other metal ions as discussed hereinafter, must be soluble in the electrolyte to form a one-phase system. Hence the amount of salt which can be incorporated in the electrolyte is limited by the salt's saturation concentration. By providing an electrolytic environment in which the salt is more soluble, more of the salt can be incorporated and hence conductivity can be increased.

Third, the solid polymeric matrix must have a certain degree of flexibility and swellability in order to function properly in the cell. If the cross-linking density is too high, the resulting polymer network is very tight, resulting in minimal flexibility and swellability.

SUMMARY OF THE INVENTION

An acrylic alkoxy substituted silane of the specified chemical structure can be polymerized and is capable of being incorporated into the polymeric backbone of a solid polymeric matrix that is useful in the formation of an electrolytic cell. The presence of recurring units derived from such acrylic alkoxy silane in the solid polymeric matrix because of its specific molecular structure advantageously facilitates the positioning of the inorganic ion salt and solvent among the polymeric molecules during service as a solid polymeric matrix. The organic monomer of this invention is represented by Formula I:

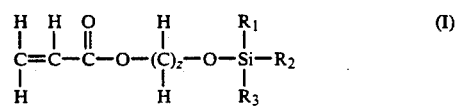

where z is 3 to 10 (preferably 4 to 6), and $R_1$, $R_2$, and $R_3$ are independently selected from the group consisting of (a) $-(Y-CH_2CH_2)_x-H$ where x is an integer of 1 to 20 (preferably 3 to 10), Y is O, S, NH, or NR where R is an alkyl group having 1 to 10 carbon atoms (preferably 1 to 4 carbon atoms), (b) an alkyl substituent having 1 to 6 carbon atoms (preferably 1 to 4 carbon atoms), (c) an alkoxy group having 1 to 6 carbon atoms (preferably 1 to 4 carbon atoms), (d) $-O-(R_4-O)_p-R_5$ where $R_4$ is an alkylene group having 1 to 4 carbon atoms (preferably 1 to 2 carbon atoms), $R_5$ is an alkyl substituent having from 1 to 4 carbon atoms (preferably 1 to 2 carbon atoms), and p is an integer from 1 to 4 (preferably 3 to 4), (e)—$SR_6$ where $R_6$ is an alkyl substituent having from 1 to 6 carbon atoms (preferably 1 to 4 carbon atoms), (f)—$NH_2$, (g)—$NHR_7$ where $R_7$ is an alkyl substituent having 1 to 6 carbon atoms (preferably 1 to 4 carbon atoms), (h)—$NR_8R_9$ where $R_8$ and $R_9$ are independently chosen from alkyl substituents having 1 to 6 carbon atoms (preferably 1 to 4 carbon atoms),

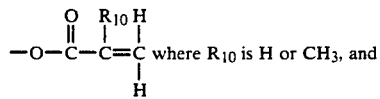

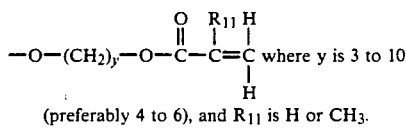

(preferably 4 to 6), and $R_{11}$ is H or $CH_3$.

When polymerized alone or when copolymerized with other monomers, such as those previously discussed, the acrylic alkoxy substituted silane forms a polymeric structure that is well-suited for serving as the solid polymeric matrix component of a solid electrolyte when combined with an inorganic ion salt and a solvent. Accordingly, the present invention further is directed to a single phase, solid, solvent-containing electrolyte which comprises:

a solid polymeric matrix
an inorganic ion salt; and
a solvent;

wherein said solid polymeric matrix is obtained by polymerizing or copolymerizing an organic monomer represented by Formula I:

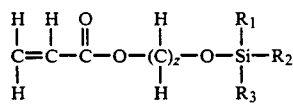

where z is 3 to 10, and $R_1$, $R_2$, and $R_3$ are independently selected from the group consisting of (a) $-(Y-CH_2CH_2)_x-H$ where x is an integer of 1 to 20, Y is O, S, NH, or NR where R is an alkyl group having 1 to 10 carbon atoms, (b) an alkyl substituent having 1 to 6 carbon atoms, (c) an alkoxy group having 1 to 6 carbon atoms, (d) $-O-(R_4-O)_p-R_5$ where $R_4$ is an alkylene group having 1 to 4 carbon atoms, $R_5$ is an alkyl substituent having from 1 to 4 carbon atoms, and p is an integer from 1 to 4, (e)—$SR_6$ where $R_6$ is an alkyl substituent having from 1 to 6 carbon atoms, (f)—$NH_2$, (g)—$NHR_7$ where $R_7$ is an alkyl substituent having 1 to 6 carbon atoms, (h)—$NR_8R_9$ where $R_8$ and $R_9$ are independently chosen from alkyl substituents having 1 to 6 carbon atoms,

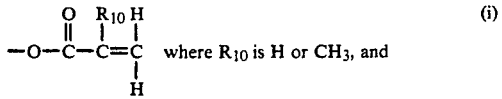

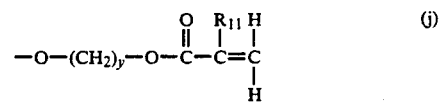

where y is 3 to 10, and $R_{11}$ is H or $CH_3$.

In yet another aspect of the present invention an electrolytic cell is provided which comprises:
(i) an anode comprising a compatible anodic material;
(ii) a cathode comprising a compatible cathodic material; and
(iii) interposed therebetween a single phase, solid, solvent-containing electrolyte which comprises: a solid polymeric matrix; an inorganic ion salt; and a solvent;

wherein said solid polymeric matrix is obtained by polymerizing or copolymerizing an organic monomer represented by the Formula I:

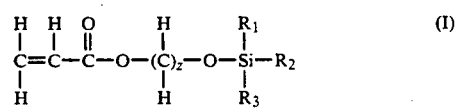

where z is 3 to 10, and $R_1$, $R_2$, and $R_3$ are independently selected from the group consisting of (a) $-Y-CH_2CH_2)_xH$ where x is an integer of 1 to 20, Y is O, S, NH, or NR where R is an alkyl group having 1 to 10 carbon atoms, (b) an alkyl substituent having 1 to 6 carbon atoms, (c) an alkoxy group having 1 to 6 carbon atoms, (d) $-O-R_4-O)_pR_5$ where $R_4$ is an alkylene group having 1 to 4 carbon atoms, $R_5$ is an alkyl substituent having from 1 to 4 carbon atoms, and p is an integer from 1 to 4, (e)—$SR_6$ where $R_6$ is an alkyl substituent having from 1 to 6 carbon atoms, (f)—$NH_2$, (g)—$NHR_7$ where $R_7$ is an alkyl substituent having 1 to 6 carbon atoms, (h)—$NR_8R_9$ where $R_8$ and $R_9$ are independently chosen from alkyl substituents having 1 to 6 carbon atoms,

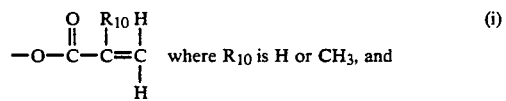

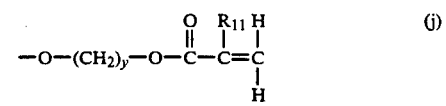

where y is 3 to 10, and $R_{11}$ is H or $CH_3$.

DETAILED DESCRIPTION OF THE PREFERRED EMBODIMENTS

As noted above, this invention is directed to solid, solvent-containing electrolytes which employ the specific solid, polymeric matrix derived from the acrylic alkoxy substituted silane monomer. Various terms used herein are defined below.

Definitions

As used herein, the specified terms have the following meanings.

The term "solid polymeric matrix" refers to an ion-conductive matrix formed by polymerizing an organic monomer containing at least one heteroatom capable of forming donor acceptor bonds with inorganic cations derived from inorganic ion salts under conditions such that the resulting polymer is useful in preparing solid electrolytes. Solid polymeric matrices are well known in the art and are described, for example, in U.S. Pat. Nos. 4,908,283 and 4,925,751 both of which are incorporated herein by reference in their entirety. The solid polymeric matrix of the present invention includes repeating units derived from the acrylic alkoxy substituted silane monomer as set forth in detail herein.

The term "inorganic ion salt" refers to any inorganic salt which is suitable for use in a solid electrolyte. Representative examples are alkali metal and ammonium salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, etc. Specific examples of suitable inorganic ion salts include $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$ and the like. The inorganic ion salt preferably contains at least one atom selected from the group consisting of Li, Na, K, Cs, Rb, Ag, Cu and Mg. Preferred inorganic ion salts are $LiPF_6$, $LiClO_4$, $NaClO_4$, $LiCF_3SO_3$, and $LiBF_4$.

The term "electrolyte solvent" refers to the solvent (i.e., plasticizer) added to the electrolyte and/or the cathode for the purpose of solubilizing the inorganic ion salt. Preferred are the various polar aprotic solvents. Examples of polar aprotic solvents useful in the invention are polar solvents such as propylene carbonate, ethylene carbonate, butylene carbonate, γ-butyrolactone, tetrahydrofuran, 2-methyltetrahydrofuran, and 1,3-dioxolane.

If the solid polymeric matrix is formed by radiation polymerization of the monomer of Formula I, then the solvent should be radiation inert at least up to the levels of radiation employed. If the solid polymeric matrix is formed by thermal polymerization, the solvent should be thermally inert at least up to the temperatures of thermal polymerization. Additionally, the solvent should not scavenge free radicals.

A particularly preferred solvent is a mixture of an organic carbonate (e.g., propylene carbonate) and triglyme as disclosed in U.S. patent application Ser. No. 07/918,509, filed Jul. 22, 1992, entitled "SOLID, SOLVENT-CONTAINING ELECTROLYTES AND ELECTROLYTIC CELLS PRODUCED THEREFROM" which application is incorporated herein by reference in its entirety.

The term "cured" or "cured product" refers to the treatment of the monomer of Formula I above (or a partial polymer thereof) under polymerization conditions (including cross-linking) so as to form a solid polymeric matrix. Suitable polymerization conditions for the acrylic portion of the monomer are well known in the art and include by way of example, heating the monomer, irradiating the monomer with UV light, electron beams, etc.

The term "electrolytic cell" refers to a composite containing an anode, a cathode, and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, and the like, and intercalation based anodes such as carbon, tungsten oxides, and the like.

The cathode is typically comprised of a compatible cathodic material (i.e., insertion compounds) which is any material which functions as a positive pole in a solid electrolytic cell. Such compatible cathodic materials are well known in the art and include, by way of example, manganese oxides, molybdenum oxides, vanadium oxides, sulfides of titanium, molybdenum and niobium, chromium oxides, copper oxides, lithiated cobalt oxides, lithiated manganese oxide, and the like. The particular compatible cathodic material employed is not critical.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of the electrolyte solvent; and from at least about 5 weight percent to 30 weight percent of a solid polymeric matrix which includes the monomer of Formula I above. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of from about 20 to about 150 microns.

Current collectors are well known in the art some of which are commercially available. A particularly preferred current collector is described hereafter. The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

Methodology

Methods for preparing solid electrolytes are well known in the art. This invention, however, utilizes a particular monomer in the preparation of solid polymeric matrix of the solid electrolyte, wherein the monomer is an acrylic alkoxy silane represented by Formula I:

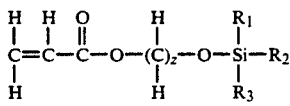

where z is 3 to 10, and $R_1$, $P_2$, and $R_3$ are as defined herein.

The synthesis of the monomer of Formula I above can be carried out by first reacting an appropriate halosilane (typically a chlorosilane) having the requisite $R_1$, $R_2$, or $R_3$ substituents with an alkyl diol of the specified chain length. The reaction typically results in the evolution of hydrogen halide (e.g., HCl). The substituted silane of the formula:

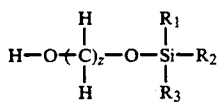

can next be reacted with acryloyl chloride with the evolution of HCl to form the acrylic alkoxy substituted silane of Formula I. Alternatively, a starting material of the formula:

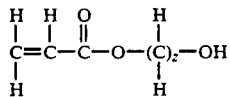

can be reacted with a compound of the formula:

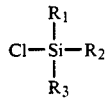

with the evolution of HCl to form the acrylic alkoxy substituted silane of Formula I.

Representative preferred acrylic alkoxy substituted silanes of Formula I are those wherein each of $R_1$, $R_2$, and $R_3$ are methoxy,

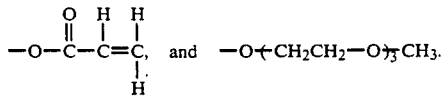

A solid polymeric matrix may be formed that contains from approximately 1 to 100 mole percent of recurring units derived from the acrylic alkoxy substituted silane of Formula I, and preferably approximately 25 to 75 mole percent of such units. Preferred units that are copolymerized with the acrylic alkoxy substituted silane are the low molecular weight acrylates having a molecular weight less than approximately 900 (e.g., 1,6-hexanediol diacrylate, Bisphenol diacrylate, hexyl acrylate, etc.).

In one embodiment, the solid, solvent-containing electrolyte is prepared by combining a compound of Formula I or a mixture of compounds of Formula I and optionally other monomers or partial polymers with an inorganic ion salt and the electrolyte solvent. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu$m). Preferably, the solid, solvent-containing electrolyte has a thickness of from about 25 to about 100 microns. The optimum thickness chosen is a function of the particular application and can readily be determined by one skilled in the art.

The electrolyte composition typically comprises from about 5 to about 25 weight percent of an inorganic ion salt based on the total weight of the electrolyte, preferably, from about 10 to about 20 weight percent, and even more preferably about 15 weight percent.

Where one or more of $R_1$, $R_2$, and $R_3$ contain an unsaturated terminal group, the compound of Formula I is readily capable of cross-linking the polymer chain.

The electrolyte composition typically comprises from about 40 to about 80 weight percent solvent based on the total weight of the electrolyte, preferably from about 60 to about 80 weight percent, and even more preferably about 70 weight percent.

The solid electrolyte composition typically comprises from about 5 to about 30 weight percent of the polymer that includes units derived from the compound of Formula I based on the total weight of the electrolyte.

In a preferred embodiment, the electrolyte composition further comprises a small amount of a film-forming agent. Suitable film-forming agents are well known in the art and include, by way of example, polypropylene oxide, polyethylene oxide, copolymers thereof, and the like, having a number average molecular weight of at least about 100,000. Preferably, the film-forming agent is employed in an amount of about 1 to about 10 weight percent and more preferably from about 2 to about 4 weight percent based on the total weight of the electrolyte composition.

The composition is cured by conventional methods to form a solid film. For example, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Ciby Geigy, Ardlesy, N.Y.), and the like.

The initiator is generally employed in an amount sufficient to catalyze the polymerization reaction. Preferably, the initiator is employed at up to about 1 weight percent based on the weight of the solid matrix-forming monomer.

When curing is by EB treatment, an initiator is not required.

The resulting solid electrolyte is a homogeneous, single phase material which is maintained upon curing, and which does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors for preventing premature monomer polymerization (e.g., protic inhibitors found in di- and triacrylate monomers) employed with the monomers are preferably removed prior to formation of the solid matrix (e.g., the cathode and/or electrolyte) by contact with a inhibitor remover such as Inhibitor Remover available as product No. 31,133-2 from Aldrich Chemical, Milwaukee, Wis. Such procedures generally will lower the inhibitor concentration to less than about 50 ppm.

In a preferred embodiment, the process of forming an electrolytic cell comprises the steps of coating the surface of a cathode with a composition comprising requisite amounts of a compound of Formula I or a mixture of compounds of Formula I, an inorganic ion salt and the electrolyte solvent. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed so that the surface of a anode is coated with a composition comprising requisite amounts of a compound of Formula I or a mixture of compounds of Formula I, an inorganic ion salt and the electrolyte solvent. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

EXAMPLE

The following example is offered to illustrate the present invention and should not be construed in any way as limiting its scope.

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black ™—available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol.

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and is mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black ™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4 to 6 $\mu$m in size with the occasional presence of 12.5 $\mu$m particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model No. 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black ™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross No. 2 mixer available from Charles Ross & Sons, Company, Hauppage, N.Y.). A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex formed by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black ™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° to 48° C. (e.g., about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and the size of the vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour, and even more preferably from about 0.2 to 1 hour. A particularly preferred combination is to heat the paste at from about 80° C. to about 90° C. for about 0.33 to about 0.5 hour.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45 to about 48° C. A Mylar cover sheet is then placed over the paste and the paste is spread to thickness of about 90 microns (μm) with a conventional plate and roller system and is cured by continuously passing the sheet through an electron beam apparatus (Electro-curtain, Energy Science Inc., Woburn, Mass.) at a voltage of about 1.75 kV and a current of about 1.0 mA and at a rate of about 1 cm/sec. After curing, the Mylar sheet is removed to provide for a solid cathode laminated to the aluminum current collector described above.

c. Electrolyte

The electrolyte may be prepared by first combining at room temperature 56.51 grams of propylene carbonate, 14.13 grams triglyme, and 10.00 grams of urethane acrylate (available as Photomer 6140 from Henkel Corporation, Coating and Chemical Division, Ambler, Pa.) until homogeneous. The resulting solution is passed through a column of 4 A sodiated molecular sieves to remove water and then is mixed at room temperature until homogeneous.

To the dried propylene carbonate, triglyme, and urethane acrylate are added 7.56 grams of the acrylic alkoxy substituted silane of Formula I where z is 6, and $R_1$, $R_2$, and $R_3$ are methoxy. To this stirred solution are added 2.56 grams of polyethylene oxide film-forming agent (weight average molecular weight of about 600,000 available as Polyox WSR-205 from Union Carbide Chemicals and Plastics, Danbury, Conn.).

In one embodiment, the polyethylene oxide film-forming agent is added to the solution via a mini-sieve such as a 25 mesh mini-sieve commercially available as Order No. 57333-965 from VWR Scientific, San Francisco, Calif..

Once the polyethylene oxide and the acrylic alkoxy substituted silane are dispersed and dissolved, the mixture is then thoroughly mixed by heating until a temperature of about 60° to 65° C. is reached which aids in the dissolution of the film-forming agent. The solution is cooled to a temperature of between 45° and 48° C., a thermocouple is placed at the edge of the vortex created by the magnetic stirrer to monitor solution temperature, and then 9.24 grams of LiPF is added to the solution over a 120 minute period while thoroughly mixing to ensure a substantially uniform temperature profile throughout the solution. Cooling is applied as necessary to maintain the temperature of the solution between 45° and 48° C.

This solution is then degassed to provide for an electrolyte solution wherein little, if any, of the $LiPF_6$ salt decomposes.

The acrylic alkoxy substituted silane may be prepared by initially reacting chlorotrimethoxy silane with 1,6-hexanediol in a dilute aprotic solvent with the loss of HCl gas to form:

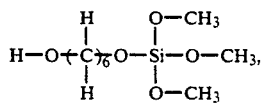

and this compound subsequently is reacted with acryloyl chloride to form the monomer of Formula I.

The resulting mixture contains the following weight percent of components:

| | |
|---|---|
| Propylene carbonate | 56.51 weight percent |
| Triglyme | 14.13 weight percent |
| Urethane acrylate (Photomer 6140) | 10.00 weight percent |
| $LiPF_6$ | 9.24 weight percent |
| Polyethylene oxide | 2.56 weight percent |
| Acrylic alkoxy substituted silane | 7.56 weight percent. |

Optionally, solutions produced as above and which contain the recited components and the $LiPF_6$ salt are filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in accordance with a mixing procedure which employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif.) and then proceed to step 4.

2. Dry the propylene carbonate and triglyme over sodiated 4 A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film-forming agent through a 25 mesh mini-sieve commercially available as Order No. 57333-965 from VWR Scientific, San Francisco, Calif. While stirring at 300 rpm, add the dried and pre-sifted polyethylene oxide film-forming agent slowing to the solution. The polyethylene oxide film-forming agent should be sifted into the center of the vortex formed by the stirring means over a 30 minute period. Addition of the polyethylene oxide film-forming agent should be dispersive and, during addition, the temperature should be maintained at room temperature (<30° C.).

5. After final addition of the polyethylene oxide film-forming agent, stir an additional 30 minutes to ensure that the film-forming agent is substantially dispersed. Then add the acrylic alkoxy substituted silane with stirring.

6. Heat the mixture to 68° to 75° C. and stir until the film-forming agent has melted and the solution has become transparent to light yellow in color. Optionally, in this step, the mixture is heated to 65° to 68° C.

7. Cool the solution produced in step 6 and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 $\mu$m at 100 percent efficiency.

At all times, the temperature of the solution should be monitored with a thermocouple which should be placed in the vortex formed by the mixer.

Afterwards, the electrolyte mixture is then coated by a conventional knife blade to a thickness of about 50 $\mu$m onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 1.75 kV and a current of about 1.0 mA and at a conveyor speed setting of 50 Which provides for a conveyor speed of about 1 cm/sec. After curing, a composite is recovered which contained a solid electrolyte laminated to a solid cathode.

D. Anode

The anode comprises a sheet of lithium foil (about 76 $\mu$m thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

Without being limited thereby, it is believed that the incorporation of recurring units derived from the silane acrylate of the invention into the polymer backbone of the solid polymeric matrix provides the advantages discussed hereafter.

By providing up to three reactive sites on the Si atom it is possible to provide up to two additional pendant groups compared with, for example, a simple acrylate. Such pendant groups can facilitate enhanced conductivity within the solid, solvent-containing electrolyte.

Additionally, the pendant groups (as defined) allow the solid polymeric matrix to "open up", such that the polymer chains are more spread out. This gives the polymer greater flexibility and swellability. If cross-link density of the polymer matrix is too high, resulting in a tightly bound polymer, one or more of the arms (i.e., pendant silane groups) may become entangled in the polymer network, but the remaining arm or arms is (are) still available for coordination.

By comparison, typical acrylic groups provide only one pendant group or arm for coordinating, and if it becomes entangled, then no pendant group is available for Li transport in those instances when the substituents on the pendant group could otherwise participate in this function.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A compound represented by Formula I:

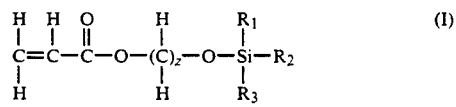
(I)

where z is 3 to 10, and $R_1R_2$, and $R_3$ are independently selected from the group consisting of (a) $-(Y-CH_2CH_2-)_xH$ where x is an integer of 1 to 20, Y is O, S, NH, or NR where R is an alkyl group having 1 to 10 carbon atoms, (b) an alkyl substituent having 1 to 6 carbon atoms, (c) an alkoxy group having 1 to 6 carbon atoms, (d)—$O-(R_4-O)_pR_5$ where $R_4$ is an alkylene group having 1 to 4 carbon atoms, $R_5$ is an alkyl substituent having from 1 to 4 carbon atoms, and p is an integer from 1 to 4, (e) —$SR_6$ where $R_6$ is an alkyl substituent having from 1 to 6 carbon atoms, (f)—$NH_2$, (g)—$NHR_7$ where $R_7$ is an alkyl substituent having 1 to 6 carbon atoms, (h)—$NR_8R_9$ where $R_8$ and $R_9$ are independently chosen from alkyl substituents having 1 to 6 carbon atoms,

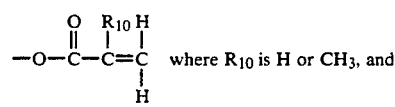
(i)

where $R_{10}$ is H or $CH_3$, and

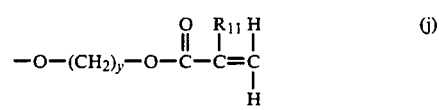
(j)

where y is 3 to 10, and $R_{11}$ is H or $CH_3$.

2. A compound according to claim 1 wherein $R_1$, $R_2$, and $R_3$ are methoxy.

3. A compound according to claim 1 wherein $R_1$, $R_2$, and $R_3$ are

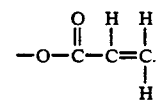

4. A compound according to claim 1 wherein $R_1$, $R_2$, and $R_3$ are —$O-(CH_2CH_2-O)_3CH_3$.

5. A single phase, solid, solvent-containing electrolyte which comprises:
a solid polymeric matrix;
an inorganic ion salt; and
a solvent;
wherein said solid polymeric matrix is obtained by polymerizing an organic monomer represented by Formula I:

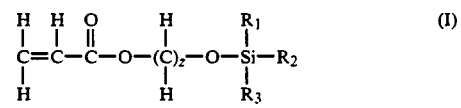
(I)

where z is 3 to 10, and $R_1$, $R_2$, and $R_3$ are independently selected from the group consisting of (a) $-(Y-CH_2CH_2-)_xH$ where x is an integer of 1 to 20, Y is O, S, NH, or NR where R is an alkyl group having 1 to 10 carbon atoms, (b) an alkyl substituent having 1 to 6 carbon atoms, (c) an alkoxy group having 1 to 6 carbon atoms, (d)—$O-(R_4-O)_pR_5$ where $R_4$ is an alkylene group having 1 to 4 carbon atoms, $R_5$ is an alkyl substituent having from 1 to 4 carbon atoms, and p is an integer from 1 to 4, (e)—$SR_6$ where $R_6$ is an alkyl substituent having from 1 to 6 carbon atoms, (f)—$NH_2$, (g)—$NHR_7$, where $R_7$ is an alkyl substituent having 1 to 6 carbon atoms, (h)—$NR_8R_9$, where $R_8$ and $R_9$ are independently chosen from alkyl substituents having 1 to 6 carbon atoms,

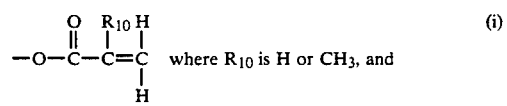
(i)

where $R_{10}$ is H or $CH_3$, and

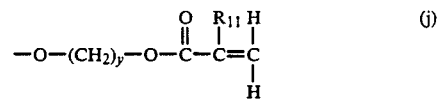
(j)

where y is 3 to 10, and $R_{11}$ is H or $CH_3$.

6. A single phase, solid solvent-containing electrolyte according to claim 5 where $R_1$, $R_2$, and $R_3$ of said solid polymeric matrix are methoxy.

7. A single phase, solid, solvent-containing electrolyte according to claim 5 where $R_1$, $R_2$, and $R_3$ of said solid polymeric matrix are

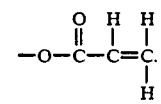

8. A single phase, solid, solvent-containing electrolyte according to claim 5 where $R_1$, $R_2$, and $R_3$ of said solid polymeric matrix are —$O-(CH_2CH_2-O)_3CH_3$.

9. A single phase, solid, solvent-containing electrolyte according to claim 5 where said inorganic ion salt is a sodium, lithium, or ammonium salt of a less mobile anion of a weak base having a large anionic radius.

10. A single phase, solid, solvent-containing electrolyte according to claim 9 where said inorganic ion salt is selected from the group consisting of $LiPF_6$, $LiClO_4$, $NaClO_4$, $LiCF_3SO_3$, and $LiBF_4$.

11. A single phase, solid, solvent-containing electrolyte according to claim 5 where said solvent is a mixture of propylene carbonate and triglyme.

12. An electrolytic cell which comprises:
(i) an anode comprising a compatible anodic material;
(ii) a cathode comprising a compatible cathodic material; and
(iii) interposed therebetween a single phase, solid, solvent-containing electrolyte which comprises: a solid polymeric matrix; an inorganic ion salt; and a solvent
wherein said solid polymeric matrix is obtained by polymerizing an organic monomer represented by the Formula I:

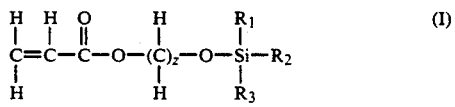

where z is 3 to 10, and $R_1$, $R_2$, and $R_3$ are independently selected from the group consisting of (a) $-(Y-CH_2CH_2)_x-H$ where x is an integer of 1 to 20, Y is O, S, NH, or NR where R is an alkyl group having 1 to 10 carbon atoms, (b) an alkyl substituent having 1 to 6 carbon atoms, (c) an alkoxy group having 1 to 6 carbon atoms, (d) $-O-(R_4-O)_p-R_5$ where $R_4$ is an alkylene group having 1 to 4 carbon atoms, $R_5$ is an alkyl substituent having from 1 to 4 carbon atoms, and p is an integer from 1 to 4, (e) $-SR_6$, where $R_6$ is an alkyl substituent having from 1 to 6 carbon atoms, (f) $-NH_2$, (g) $-NHR_7$, where $R_7$ is an alkyl substituent having 1 to 6 carbon atoms, (h) $-NR_8R_9$, where $R_8$ and $R_9$ are independently chosen from alkyl substituents having 1 to 6 carbon atoms,

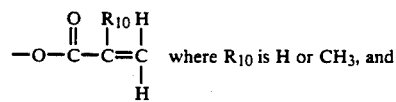 (i)

where $R_{10}$ is H or $CH_3$, and

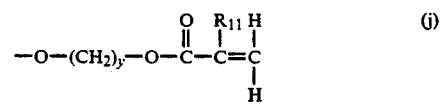 (j)

where y is 3 to 10, and $R_{11}$ is H or $CH_3$.

13. An electrolytic cell according to claim 12 wherein $R_1$, $R_2$, and $R_3$ are methoxy.

14. An electrolytic cell according to claim 12 wherein $R_1$, $R_2$, and $R_3$ are

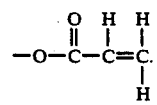

15. An electrolytic cell according to claim 12 wherein $R_1$, $R_2$, and $R_3$ are $-O(CH_2CH_2-O)_3CH_3$.

16. An electrolytic cell according to claim 12 wherein said inorganic ion salt is a sodium, lithium, or ammonium salt of a less mobile anion of a weak base having a large anionic radius.

17. An electrolytic cell according to claim 16 wherein said inorganic ion salt is selected from the group consisting of $LiPF_6$, $LiClO_4$, $NaClO_4$, $LiCF_3CSO_3$, and $LiBF_4$.

18. An electrolytic cell according to claim 12 wherein said solvent is a mixture of propylene carbonate and triglyme.

19. An electrolyte according to claim 5 wherein said organic monomer represented by Formula I is copolymerized with a co-monomer which is also represented by Formula I.

20. An electrolytic cell according to claim 12 wherein an organic monomer represented by Formula is copolymerized with a co-monomer which is also represented by Formula I.

* * * * *